United States Patent

[11] 3,612,551

| [72] | Inventor | Paul Joseph Grabill, Jr.<br>Sterling Heights, Mich. |
|---|---|---|
| [21] | Appl. No. | 874,628 |
| [22] | Filed | Nov. 6, 1969 |
| [45] | Patented | Oct. 12, 1971 |
| [73] | Assignee | TRW Inc.<br>Cleveland, Ohio |

[54] BIDIRECTIONAL LIP SEAL
6 Claims, 7 Drawing Figs.

[52] U.S. Cl................................................. 277/163,
277/206 A
[51] Int. Cl.................................................. F16j 15/32
[50] Field of Search............................................ 277/163,
206.1

[56] References Cited
UNITED STATES PATENTS
| 2,173,247 | 9/1939 | Bott.............................. | 277/206.1 |
| 2,888,281 | 5/1959 | Ratti............................. | 277/206.1 |

FOREIGN PATENTS
| 574,534 | 1/1946 | Great Britain................ | 277/157 |

Primary Examiner—Robert L. Smith
Attorney—Hill, Sherman, Meroni, Gross & Simpson ABSTRACT: A circumferential spring-loaded plastics material packing ring particularly adapted for sealing relatively movable or stationary members, which has a generally X-shaped cross section providing a pair of diverging lips on each side thereof and a central peripheral groove receiving a circumferential spring to load the two lips on one periphery of the ring against one surface and to load the two lips on the other periphery of the ring against the other surface, thereby providing bidirectional sealing.

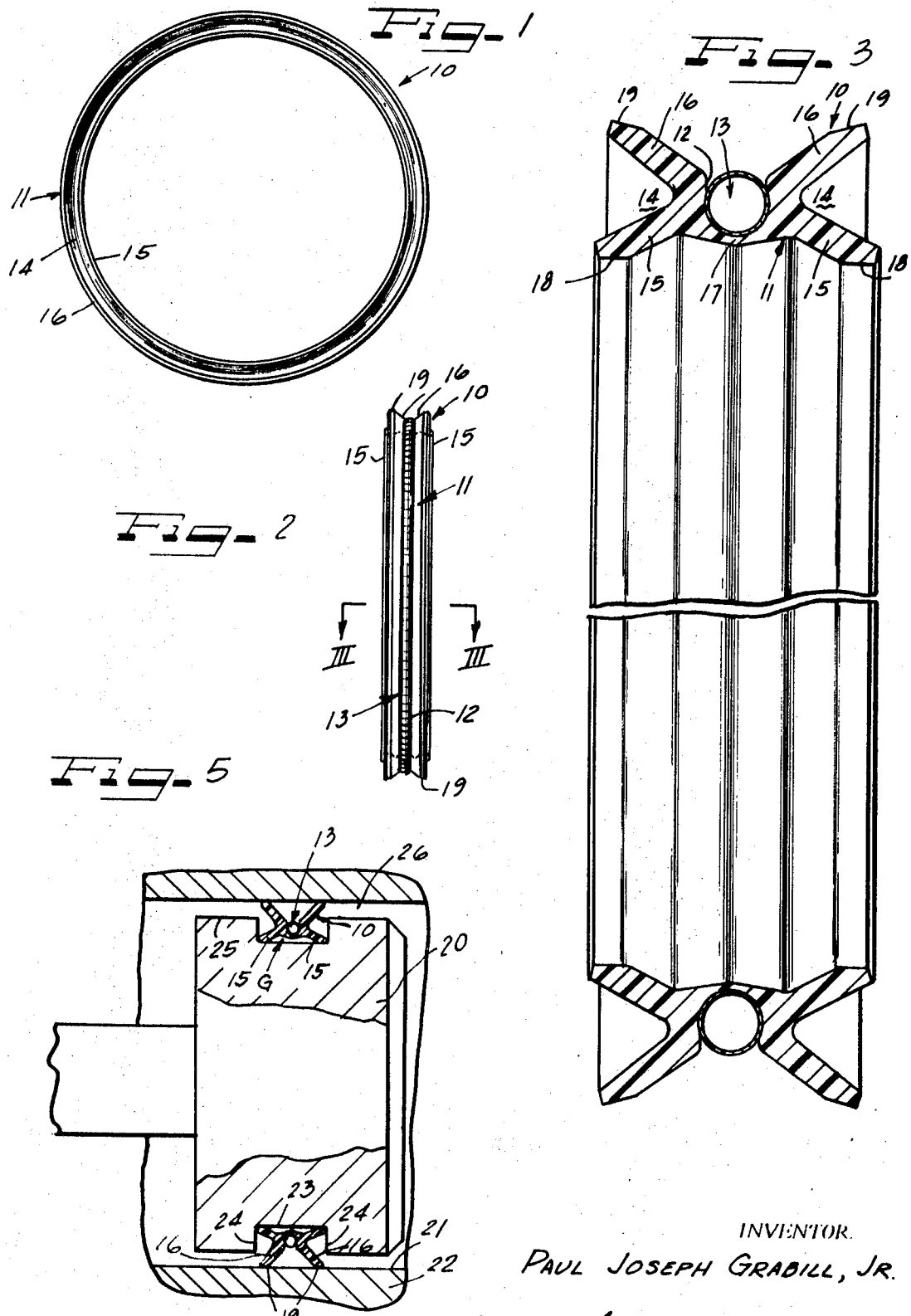

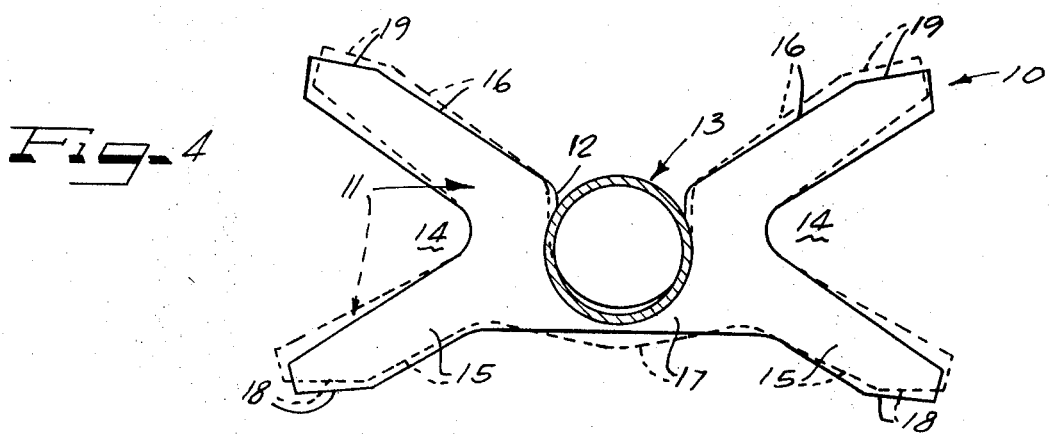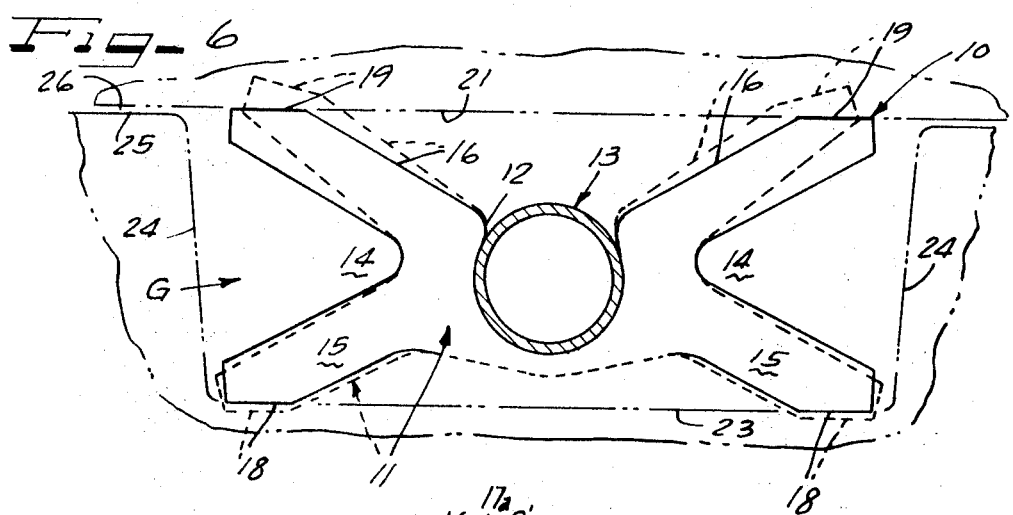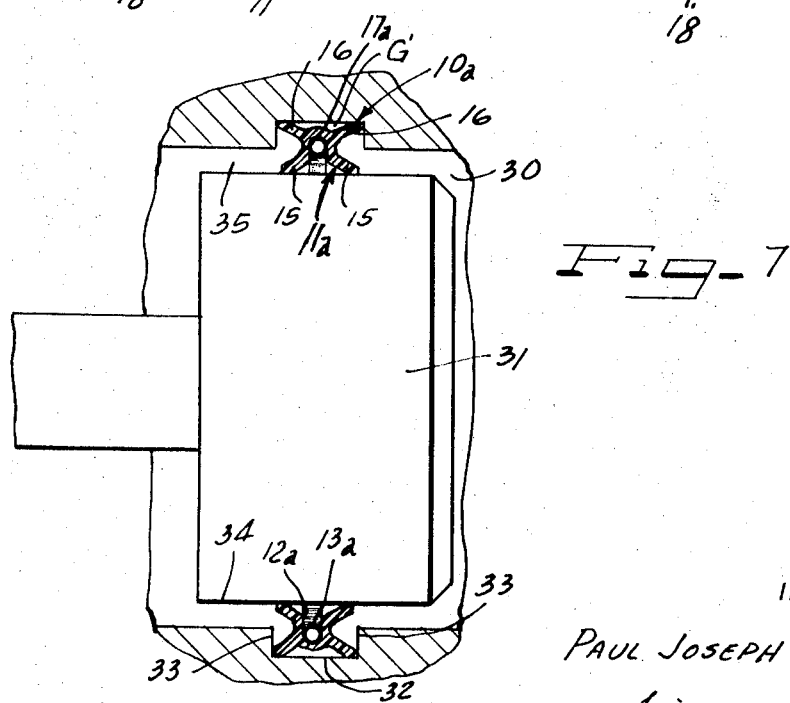
INVENTOR.
PAUL JOSEPH GRABILL, JR.

BIDIRECTIONAL LIP SEAL

BACKGROUND OF THE INVENTION

1. Field of the Invention

This invention pertains to the lip seal art, and particularly to a single plastics material packing ring with two pairs of diverging lips controlled by a circumferential contracting or expanding spring in an internal or external peripheral groove of the ring so that the lips on one periphery of the ring will be pressed against one surface to be sealed and the lips on the other periphery of the ring will be loaded against the other surface to be sealed. The packing ring has low breakout and running friction properties and is especially suitable for control spools in spool valves to function with low hysteresis and excellent response.

2. Description of the Prior Art

Lip seals with spring-loaded lips are known in the prior art as, for example, in U.S. Pat. Nos. 2,736,586 and 2,816,784. In these prior art arrangements, however, a garter spring surrounds the lip of the seal to contract it on an inserted shaft producing high friction losses. These seals are useful where the parts to be sealed are relatively free from reciprocating movement and the pressure to be sealed exists only on one side of the lip.

SUMMARY OF THE INVENTION

This invention now provides bidirectional seals especially suitable for use in sealing relatively reciprocating members such as piston and cylinder combinations, rod and sleeve assemblies, and particularly spool valve and housing assemblies, but also suitable for rotating members to act as a shaft seal or the like and for static seals between stationary members.

The preferred seal of this invention includes a one-piece packing ring composed of plastics material such as nylon, Teflon (polytetrafluoroethylene), urethanes, synthetic and natural rubbers and the like relatively stiff elastomeric material. The plastics may be filled with fibers or lubricants such as glass-filled nylon and molybdenum-sulfide-filled "Teflon." A Shore hardness on the "A" scale of from 65 to 85 is desirable for the plastics.

The plastics ring has a generally X-shaped cross section providing four legs or sealing lips, including a first pair sloping laterally outward and radially inward from the inner periphery of the ring and a second pair sloping laterally outward and radially outward from the outer periphery of the ring. The ring also has a peripheral groove between one pair of lips. This groove is around the outer periphery of the ring and opens outwardly in external applications where the ring is seated in a peripheral groove around a piston or the like and, conversely, is around the inner periphery of the ring and opens inwardly in internal applications where the ring is seated in the groove in a bore of a housing or the like. This groove in the ring receives a circumferential spring which either contracts or expands the ring, depending on the position of the groove and the intended application of the seal. The spring may be any expanding or contracting metal ring and is referred to herein as a "garter" spring. The garter spring either expands or contracts to directly preload the lips on one periphery of the ring, and at the same time bends the ring to preload the lips on the opposite periphery into sealing engagement with their confronting surface.

The seals of this invention close the annular space between two stationary or relatively moving, contiguous members, and one of these members preferably has an annular groove opposite to and facing the other member for receiving the ring.

Since sealing lips are provided at the four corners of the ring, and since the lips at each side of the ring diverge, V-grooves are provided therebetween. These V-grooves may be exposed to the pressurized fluid being sealed, and since they are provided on opposite sides of the seal and open in opposite directions, the seal effectively resists leakage of pressurized fluids on both the upstream and downstream sides of the seal. The pressurized fluids will tend to spread the lips apart, causing them to automatically increase their sealing force on the contiguous surfaces being sealed as the fluid pressure increases.

The lips engage the surface which they seal at their outer ends, and the engaging area increases as pressure in the side grooves between the lips tend to spread them apart.

Since the force of the garter spring is exerted at an area between the internal and external lips, the sealing load may be minimized and low breakaway and running friction is obtained.

The diverging slopes of the lips accommodate self-seating through wide variations in the annular gap to be sealed, since the lips will readily flex to accommodate these dimensional variations.

It is then an object of this invention to provide a bidirectional lip seal.

Another object of this invention is to provide a low-friction lip seal especially suitable for sealing relatively reciprocating members in both directions of reciprocation.

Another object of this invention is to provide a packing ring of plastics material loaded by a garter spring and shaped to present a pair of diverging lips on each side thereof separated by a groove exposed to the media to be sealed for pressing the lips against the surfaces to be sealed.

Another object of this invention is to provide a one-piece plastics packing ring of generally X-shaped cross section with a pair of laterally extending and inwardly directed lips on the inner periphery and a pair of laterally extending and outwardly directed lips on the outer periphery, together with a garter spring around the central portion thereof to load the ring for pressing the lips against the adjacent surfaces to be sealed thereby.

A specific object of this invention is to provide a bidirectional lip seal having diverging lips extending from the four corners thereof and a garter spring pressing the lips on one periphery and rocking the lips on the other periphery of the ring into sealing engagement with contiguous surfaces.

Another object of this invention is to provide a bidirectional lip seal for annular gaps between relatively reciprocating members which will accommodate itself to gaps of widely varying size.

Other objects, features and advantages of this invention will be readily apparent from the following description of certain preferred embodiments thereof, taken in conjunction with the accompanying drawings, although variations and modifications may be effected without departing from the spirit and scope of the novel concepts of the disclosure.

BRIEF DESCRIPTION OF THE DRAWINGS

FIG. 1 is a plan view of a seal according to this invention;

FIG. 2 is an end elevational view of the seal of FIG. 1;

FIG. 3 is a cross-sectional view of the seal of FIGS. 1 and 2, taken along the line III—III of FIG. 2 and shown on an enlarged scale;

FIG. 4 is an enlarged cross-sectional view of the seal of FIGS. 1—3 illustrating in solid lines the free position of the seal ring without the garter spring and illustrating in dashed lines the position of the seal ring when loaded by the garter spring;

FIG. 5 is a fragmentary cross-sectional view with parts in elevation of a piston and cylinder combination showing an external application of the seal of this invention wherein the seal ring is seated in a groove in the piston;

FIG. 6 is a view similar to FIG. 4, but showing the seal mounted for external application in the groove of a piston or the like, and illustrating in dashed lines the free garter spring loaded position of the seal, and in solid lines the installed position of the seal;

FIG. 7 is a view similar to FIG. 5, but illustrating an internal application of the seal wherein the seal ring is seated in an inwardly opening groove in the cylinder.

DESCRIPTION OF THE PREFERRED EMBODIMENT

The seal 10 of FIGS. 1—6 is for external application and compressive loading in an outwardly opening annular groove. The seal 10 consists of a one-piece annulus body or ring 11 composed of a plastics material having some elastomeric properties, but being relatively stiff and wear-resisting. Suitable plastics materials are Teflon (polytetrafluoroethylene), nylon, synthetic rubbers of sufficient durometer hardness to resist free bending, and the like.

The ring 11 has a generally X-shaped cross section with an outwardly opening peripheral groove 12 around the central portion thereof receiving a garter spring 13 which remains in stretched condition when seated in the bottom of the groove so as to exert a compressing action on the ring 11.

The sides of the ring 11 have V-grooves 14 therearound bounded by diverging lips 15 and 16. The lips 16 slope laterally and radially outward from the groove 12 and are on the outer periphery of the ring 11. The lips 15 slope laterally outward and radially inward from a body portion 17 of the ring under the groove 12. These lips 15 are on the inner periphery of the ring 11.

The lips 15 have bevelled inner peripheral faces 18 at their extremities, and the lips 16 have similar outer bevelled faces 19 at their outer extremities. These bevelled faces 18 and 19 provide band areas where the lips normally engage the adjacent surfaces to be sealed.

As shown in FIG. 4, the garter spring 13 will deform the seal ring 11 from the free position shown in solid lines to the position shown in dashed lines. Thus, when the garter spring 13 is seated in the bottom of the groove 12, it remains in a stretched condition where it will exert a contracting force on the ring 11. This contracting force bends the ring about the body portion 17 underlying the groove 12 to depress the body portion to the dotted line position, thereby swinging the lips 15 and 16 radially outward, while at the same time exerting a contracting force on the ring.

As shown in FIG. 5, the seal 10 is mounted in a peripheral groove G of a piston or spool 20 riding in a cylindrical bore 21 of a cylinder or housing 22. The groove G has a bottom wall 23 and radial sidewalls 24 extending outwardly from the bottom wall to the cylindrical periphery 25 of the piston or spool 20. The seal 10 seals the annular gap 26 between the piston periphery 25 and the bore 21.

As shown in FIG. 6, the seal ring 11 is deformed from its garter spring loaded position of FIG. 4, also shown in dashed lines in FIG. 6, when the seal assembly 10 is inserted in the groove G to act against the bore 21. In the installed position of FIG. 6 the lips 15 are pushed radially outward from the dashed line position so that the inner peripheral faces 18 thereof will be pressed against the bottom wall 23 of the groove G. At the same time the lips 16 are pressed radially inward from the dashed line position to the solid line position so that their engaging faces 19 will press against the bore 21.

It will be noted that the grooves 14 between the lips 15 and 16 are exposed to the gap 26 to be sealed and, therefore, pressure in this gap can act on the gap-defining lips to spread the same apart and urge their faces 18 and 19 against the bottom 23 of the groove G. It will also be noted that the extremities of the lips 15 extend laterally beyond the extremities of the lips 16 so that the grooves 14 will not be closed from the gap 26 even when the seal assembly 10 is shifted to move a lip 18 against a groove sidewall 24.

As the piston 20 is reciprocated in the bore 21 the faces 19 of the lips 16 will ride on the bore under preload determined primarily by the garter spring 13. Variations in the spacing between the bottom 23 of the groove G and the bore 21 will have little effect on the load. However, since the side grooves 14 are open to the annular gap 26 being sealed on both sides of the groove G, the sealing lips defining these grooves are sensitive to the pressure therein and will be forced outwardly into sealing engagement with the bore 21 and the bottom 23 of the groove by this pressure. Therefore, the pressure being sealed contributes to the loading of the lips against the surface to be sealed, and the seal is self-compensating to accommodate variations in pressure. Because of this self-compensating feature, the initial garter spring load on the seal ring 11 may be very light, and need only be just sufficient to hold the lips in sealing engagement with the surfaces being sealed on the low pressure side of the assembly.

The seal assembly 10a of FIG. 7 is a modification of the seal 10 intended for internal application as, for example, when seated in an inwardly opening groove G' in a bore 30 slidably mounting a piston 31. The groove G' has a cylindrical bottom 32 and radial sidewalls 33 extending to the bore 30. The piston 31 has a cylindrical periphery 34 riding in the bore 30. An annular gap 35 between the periphery 34 of the piston 31 and the bore 30 is sealed by the seal assembly 10a.

The seal assembly 10a has a modified seal ring 11a the same as the seal ring 11, but with an inwardly opening groove 12a receiving a contracted garter spring 13a exerting an expanding force on the ring 11a to load the lips 15 and 16 against the periphery 34 of the piston 31 and the bottom 32 of the groove G', respectively. The expanding garter spring 13a bows the body portion 17a of the ring 11a outwardly to rock the lips 15 and 16 into loaded engagement with the piston periphery 34 and the bottom 32 of the groove G' to act in the same manner as in the seal 10.

From the above descriptions it will, therefore, be understood that this invention provides a relatively simple, inexpensive seal for internal and external application between relatively reciprocating members. The seal is initially loaded by a garter spring, has bidirectional sealing capacity and is sensitive to the pressure of the fluid being sealed to increase the initial loading as the pressure increases. The seal has exceptionally low friction properties, a long wear life, and is easy to install.

The term "garter" spring, as used herein and in the claims, is used in a generic sense to include, in addition to the illustrated coil spring rings, any circumferential spring, such as internal and external snap rings and the like which exert radial inward forces in the embodiments of the invention having the external groove or radial outward forces in those embodiments of the invention having the internal groove.

I claim as my invention:

1. An elastomeric sealing ring for bidirectional sealing in an axial direction comprising: a 360° ring member, said ring member having first and second V-shaped cross section portions, said portions opening away from one another in an axial direction having diverging wall sections, the inner diameter wall section of each of said portions connected to the inner diameter wall section of the other portion by a circumferential portion spaced radially outwardly from the innermost diameter of the V-shaped portions, the said V-shaped portion axially spaced from one another except for said circumferential portion, a radially outwardly opening groove between the said V-shaped portions, the said groove bounded by the V-shaped portions on the axial ends of the groove and bounded by the circumferential portion on the inner diameter of the groove, and a constricting spring means received in the groove.

2. The seal of claim 1 wherein the groove is around the inner periphery of the ring and an expanding spring means is received in the groove.

3. The sealing ring of claim 1 wherein the said V-shaped portions terminate in sealing lip ends.

4. The sealing ring of claim 3 wherein the sealing lips are bevelled, forming seating areas.

5. The sealing ring of claim 1 wherein the portion of the ring below the spring receiving groove is flexible to be bowed by the action of the spring.

6. The sealing ring of claim 4 wherein the lips on the inner periphery of the ring extend laterally beyond the lips on the outer periphery of the ring.